US012410759B1

(12) United States Patent
Tranel et al.

(10) Patent No.: US 12,410,759 B1
(45) Date of Patent: Sep. 9, 2025

(54) WAVEFORM FOR METERING FUEL INTO A FUEL INJECTOR

(71) Applicant: Caterpillar Inc., Peoria, IL (US)

(72) Inventors: Brian V. Tranel, Dunlap, IL (US); Dustin K. Fee, Peoria, IL (US); Kaushik K. Krishnamurthy, Manteno, IL (US); Andrew O. Marrack, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/778,453

(22) Filed: Jul. 19, 2024

(51) Int. Cl.
*F02D 41/00* (2006.01)
*F02D 19/06* (2006.01)
*F02D 41/22* (2006.01)

(52) U.S. Cl.
CPC .. *F02D 41/0025* (2013.01); *F02D 2200/0611* (2013.01); *F02D 2200/0614* (2013.01); *F02D 2250/14* (2013.01)

(58) Field of Classification Search
CPC .. F02D 41/0087; F02D 41/221; F02D 41/365; F02D 41/2467; F02D 41/3845; F02D 41/3836; F02D 19/027; F02D 19/025; F02D 41/3827; F02D 2200/0614; F02D 2200/0618; F02D 2200/0602; F02D 2200/063; F02D 2041/228; F02D 2041/224; F02D 19/06; F02D 19/0684; F02D 19/0689; F02D 19/0694; F02M 65/001; F02M 65/003; F02M 55/008; F02M 61/20; F02M 63/005; F02M 51/0625; F02M 63/0054; F02M 57/005; F02M 43/04
USPC ......... 701/102–105, 112–115; 123/299–305, 123/443–446, 472, 478, 480, 482, 490
See application file for complete search history.

(56) References Cited

U.S. PATENT DOCUMENTS

| | | | | |
|---|---|---|---|---|
| 4,292,948 | A | 10/1981 | Graessley | |
| 5,099,814 | A | 3/1992 | Ament | |
| 5,101,797 | A | 4/1992 | Sturz et al. | |
| 6,480,781 | B1 * | 11/2002 | Hafner | F02D 41/1498 701/104 |
| 6,606,974 | B1 * | 8/2003 | Duffy | F02D 41/405 123/299 |
| 6,705,278 | B2 * | 3/2004 | McGee | F02D 41/045 123/299 |
| 8,364,384 | B2 * | 1/2013 | Pursifull | F02D 41/3845 123/299 |

(Continued)

FOREIGN PATENT DOCUMENTS

| | | | |
|---|---|---|---|
| DE | 102006025360 | B3 | 10/2007 |
| DE | 102007000070 | B4 | 3/2017 |
| DE | 102008044144 | B4 | 9/2021 |

*Primary Examiner* — Hai H Huynh
*Assistant Examiner* — Johnny H Hoang
(74) *Attorney, Agent, or Firm* — Bookoff McAndrews, PLLC

(57) ABSTRACT

A multi-fuel injection system and method for generating combustion signals and metering signals for fuel injectors are provided. A first fuel and a second fuel may be received. A combustion signal may be generated to cause a fuel injector to perform fuel injection to inject at least one of the first fuel or the second fuel into a cylinder of an engine. A metering signal may be generated to cause the fuel injector to perform fuel metering to introduce the second fuel into a nozzle of the fuel injector while the fuel injector is not injecting either of the first fuel or the second fuel into the cylinder of the engine.

20 Claims, 7 Drawing Sheets

(56) References Cited

U.S. PATENT DOCUMENTS

| | | | | |
|---|---|---|---|---|
| 10,358,996 | B2 | 7/2019 | Andersson et al. | |
| 2002/0195081 | A1 * | 12/2002 | McGee | F02D 41/403<br>123/492 |
| 2016/0123286 | A1 * | 5/2016 | Hou | F02M 45/086<br>123/304 |

* cited by examiner

WAVEFORM FOR METERING FUEL INTO A FUEL INJECTOR

TECHNICAL FIELD

The present disclosure relates generally to fuel injectors, and, more particularly, to a system and method for generating combustion signals and metering signals for fuel injectors.

BACKGROUND

Fuel injection systems typically include fuel injectors that each inject fuel for combustion in cylinders of an engine. An electronic control module (ECM) of the fuel injection system is configured to transmit signals to cause the fuel injector to perform fuel injection. Signals transmitted to solenoids of fuel injectors tend to generate heat. In some fuel injection systems, heat builds when fuel injector solenoids are energized for relatively long periods of time. Increased heat can, in some circumstances impact performance of the fuel injector, cause increased wear, or even result in overheating.

German Patent No. DE102007000070B4, issued on Mar. 23, 2017 ("the '070 Patent"), describes a pulse control system for fuel injection for an internal combustion engine that includes a solenoid valve connected to a controller which generates variable pulse lengths between the on phase and the off phase of the fuel supply cycle. The valve can be controlled sequentially with a mixture of a strong control mode and a smaller control mode. The '070 Patent does not describe a system and method for generating a combustion signal having a combustion waveform and a metering signal having a metering waveform.

The system and method of the present disclosure may solve one or more of the problems set forth above and/or other problems in the art. The scope of the current disclosure, however, is defined by the attached claims, and not by the ability to solve any specific problem.

SUMMARY

In one aspect, a method may include receiving, by a multi-fuel injection system, a first fuel; receiving, by the multi-fuel injection system, a second fuel; generating, by the multi-fuel injection system, a combustion signal to cause a fuel injector to perform fuel injection to inject at least one of the first fuel or the second fuel into a cylinder of an engine; and generating, by the multi-fuel injection system, a metering signal to cause the fuel injector to perform fuel metering to introduce the second fuel into a nozzle of the fuel injector while the fuel injector is not injecting either of the first fuel or the second fuel into the cylinder of the engine, wherein the combustion signal includes a combustion waveform including at least one of a combustion keep-in section or a combustion hold-in section, wherein the metering signal includes a metering waveform including at least one of a metering keep-in section or a metering hold-in section, and wherein a duration of the metering keep-in section is different than a duration of the combustion keep-in section or an amplitude of the metering hold-in section is different than an amplitude of the combustion hold-in section.

In one aspect, an electronic control module (ECM) may include a memory configured to store instructions; and one or more processors configured to execute the instructions to: generate a combustion signal to cause a fuel injector to perform fuel injection to inject at least one of a first fuel or a second fuel into a cylinder of an engine; and generate a metering signal to cause the fuel injector to perform fuel metering to introduce the second fuel into a nozzle of the fuel injector while the fuel injector is not injecting either of the first fuel or the second fuel into the cylinder of the engine, wherein the combustion signal includes a combustion waveform including at least one of a combustion keep-in section or a combustion hold-in section, wherein the metering signal includes a metering waveform including at least one of a metering keep-in section or a metering hold-in section, and wherein a duration of the metering keep-in section is different than a duration of the combustion keep-in section or an amplitude of the metering hold-in section is different than an amplitude of the combustion hold-in section.

In one aspect, a system may include a fuel injector configured to perform fuel injection and fuel metering; and an electronic control module (ECM) configured to: generate a combustion signal to cause the fuel injector to perform the fuel injection to inject at least one of a first fuel or a second fuel into a cylinder of an engine; and generate a metering signal to cause the fuel injector to perform the fuel metering to introduce the second fuel into a nozzle of the fuel injector while the fuel injector is not injecting either of the first fuel or the second fuel into the cylinder of the engine, wherein the combustion signal includes a combustion waveform including at least one of a combustion keep-in section or a combustion hold-in section, wherein the metering signal includes a metering waveform including at least one of a metering keep-in section or a metering hold-in section, and wherein a duration of the metering keep-in section is different than a duration of the combustion keep-in section or an amplitude of the metering hold-in section is different than an amplitude of the combustion hold-in section.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of +10% in the stated value.

Figure 1:
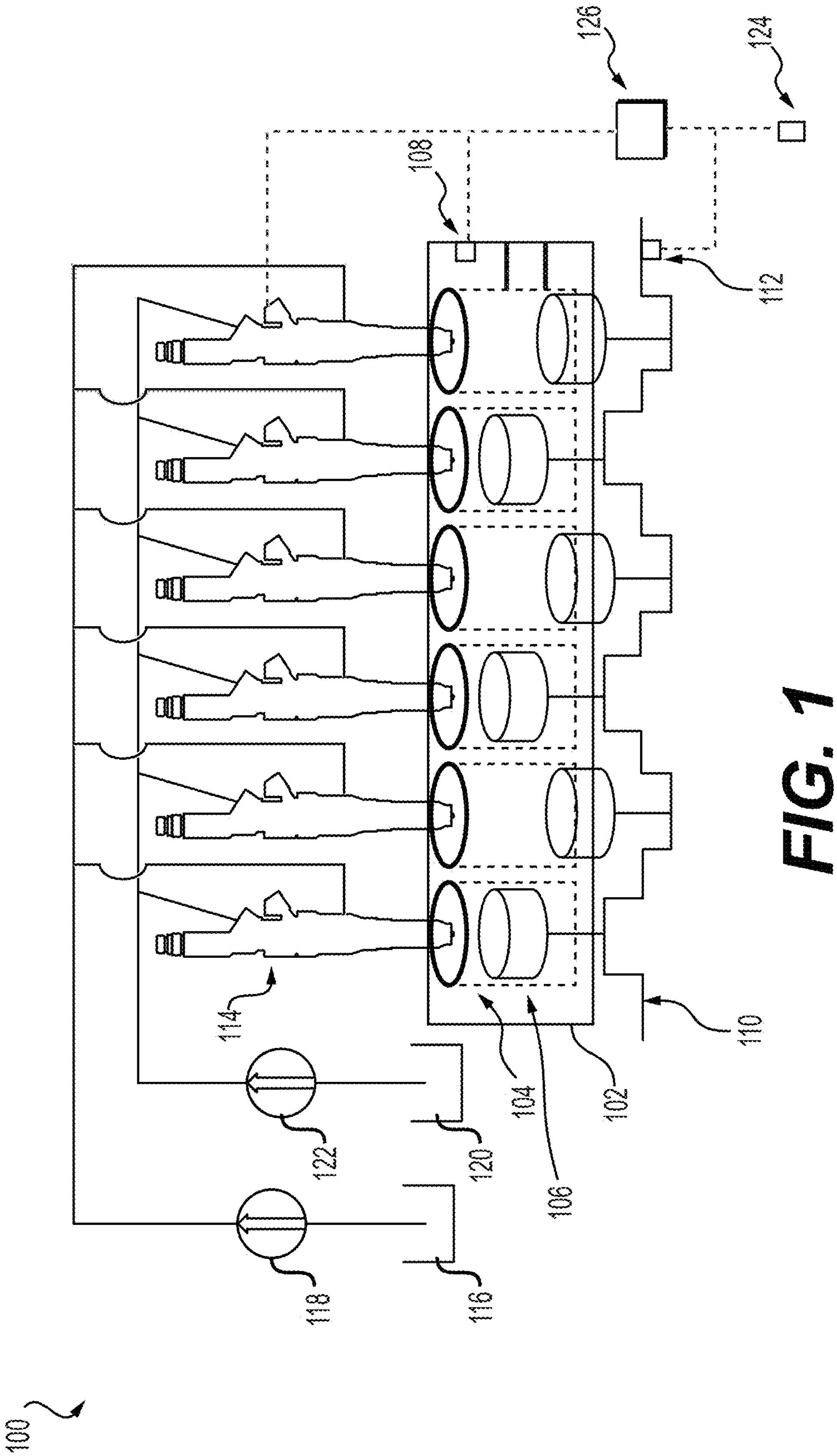
FIG. 1 is a diagram of an example multi-fuel injection system.

FIG. 1 is a diagram of an example multi-fuel injection system 100. As shown in FIG. 1, the multi-fuel injection system 100 may include an engine 102, cylinders 104, pistons 106, an engine sensor 108, a crankshaft 110, a crankshaft sensor 112, fuel injectors 114, a primary fuel reservoir 116, a primary fuel pump 118, a pilot fuel reservoir 120, a pilot fuel pump 122, a sensor 124, and an ECM 126.

According to an embodiment, the multi-fuel injection system 100 may be provided in heavy equipment or other types of mobile or stationary industrial machines. For example, heavy equipment may include an articulated truck, an asphalt paver, a backhoe loader, a cold planer, a compactor, a dozer, a dragline, a drill, an excavator, a mining shovel, a material handler, a motor grader, a wheel loader, or the like. Other types of suitable industrial machines include stationary or mobile power generation machines, among others. According to an embodiment, the multi-fuel injection system 100 may be provided in a marine power system. For example, a marine power system may include a propulsion engine, a marine generator, an auxiliary engine, or the like. In other examples, the multi-fuel injection system 100 may be provided in an oil and gas system. The oil and gas system may include a power grid stabilization system, a gas compression engine, a land drilling engine, a land drilling generator, a land production generator, an offshore drilling and production generator, a well service engine, or the like. Alternatively, the multi-fuel injection system 100 may be provided in an industrial power system. For example, the industrial power system may include an industrial diesel engine, an industrial diesel power unit, a diesel fire pump, or the like.

The engine 102 may include one or more cylinders 104. The engine 102 may include an engine sensor 108 that is configured to output engine sensor data. The engine sensor data may include a heat value of the engine 102, a heat value of a cylinder 104, a pressure value of a cylinder 104, a speed of the engine 102, or the like. Each cylinder 104 may include a piston 106 that is connected to a crankshaft 110. The piston 106 may travel between top dead center and bottom dead center to rotate the crankshaft 110. The crankshaft sensor 112 is configured to output crankshaft sensor data. The crankshaft sensor data may indicates a rotation angle of the crankshaft 110, a rotational speed of the crankshaft 110, or the like. Each cylinder 104 may include a corresponding fuel injector 114 that is configured to inject fuel into the cylinder 104.

The primary fuel reservoir 116 may store a primary fuel. The primary fuel pump 118 may pump the primary fuel from the primary fuel reservoir 116 to respective fuel injectors 114. The pilot fuel reservoir 120 may store a pilot fuel. The pilot fuel pump 122 may pump the pilot fuel to respective fuel injectors 114. The fuel injector 114 may be configured to inject the primary fuel and the pilot fuel into the cylinder 104. According to an embodiment, the primary fuel may be methanol, and the pilot fuel may be diesel. Alternatively, the primary fuel may be ethanol (e.g., E85), biodiesel, biogas, hydrogenated vegetable oil, or the like, and the pilot fuel may be dimethyl ether, Fischer-Tropsch fuel, or the like. For a single combustion cycle, the fuel injector 114 may inject a total amount of fuel into the cylinder 104. The total amount of fuel may include an amount of the primary fuel and an amount of the pilot fuel. A percentage of the amount of the primary fuel to the total amount of fuel may be greater than or equal to a threshold (e.g., 50%, 60%, or the like). Further, a percentage of the pilot fuel to the total amount of fuel may be less than or equal to the threshold. For each combustion cycle, the fuel injector 114 may inject the pilot fuel entirely before the primary fuel, may inject the pilot fuel substantially before the primary fuel, or the like.

The sensor 124 may be configured to output sensor data to the ECM 126. For example, the sensor data may indicate a gas pedal position, a brake pedal position, a lever position, a geographical position, a temperature, a pressure, a speed, an acceleration, a maintenance status, a fuel amount, or the like.

The ECM 126 may be configured to generate a combustion signal having a combustion waveform. The combustion signal may cause fuel injection by the fuel injector 114. The ECM 126 may be configured to generate a metering signal having a metering waveform. The ECM 126 may cause fuel metering of the fuel injector 114.

Although FIG. 1 depicts particular components, a particular arrangement of the components, and a particular number of the components, it should be understood that other embodiments may include different components, a different arrangement of components, and/or a different number of components.

Figure 2:
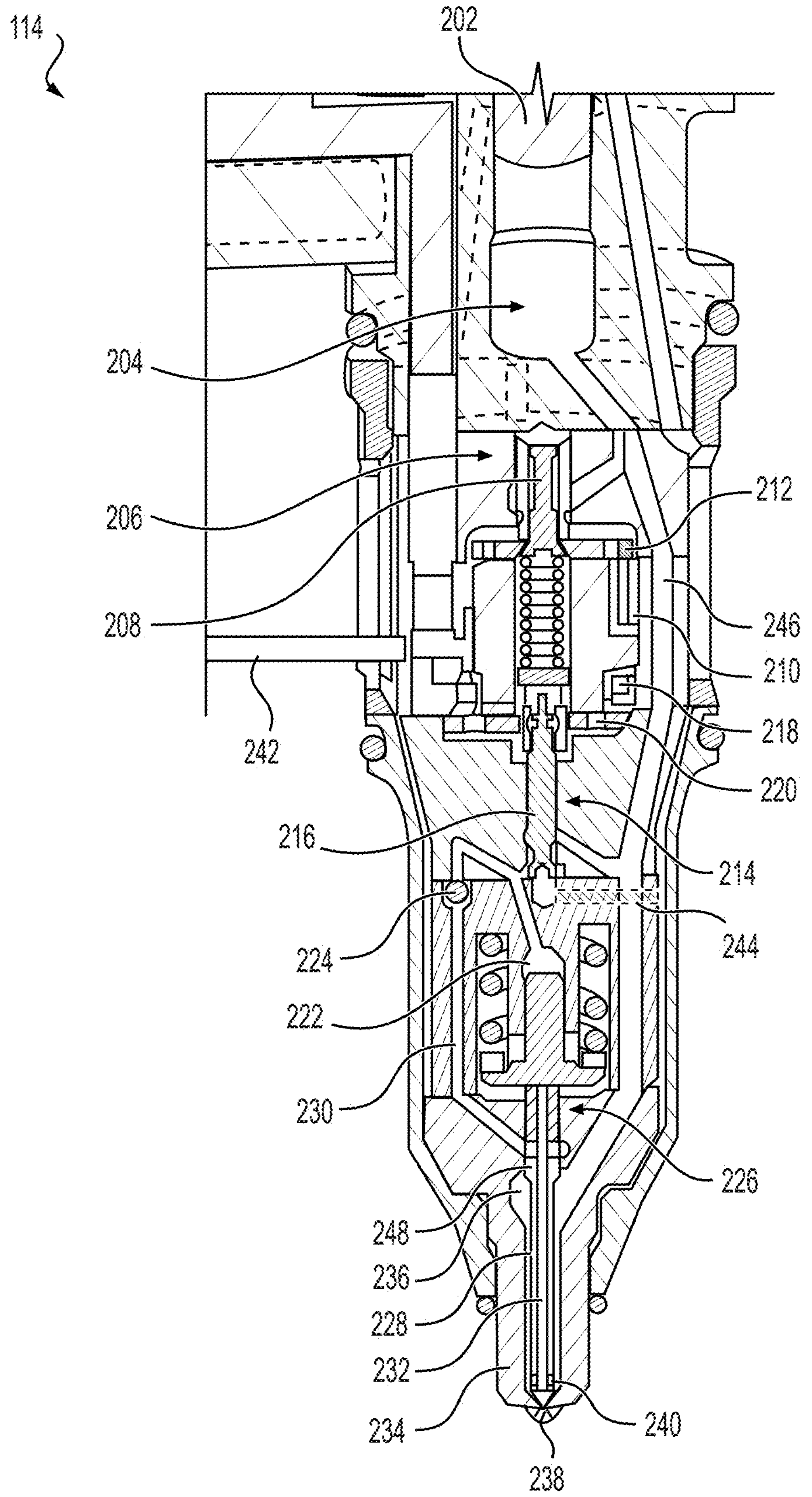
FIG. 2 is a diagram of an example fuel injector.

FIG. 2 is a diagram of an example fuel injector 114. As shown in FIG. 2, the fuel injector 114 may include a plunger 202, a chamber 204, a spill valve 206, a spill valve member 208, a spill valve solenoid 210, a spill valve armature 212, a control valve 214, a control valve member 216, a control valve solenoid 218, a control valve armature 220, a control chamber 222, a one-way valve 224, an injection valve 226, an injection valve member 228, an injection valve fill passage 230, an injection valve passage 232, a nozzle 234, a nozzle chamber 236, an orifice 238, a pilot fuel opening 240, a pilot fuel supply connection 242, a low-pressure fuel passage 244, a pressurized fuel passage 246, and a radial fuel passage 248.

The spill valve 206 may include the spill valve member 208 that is movable between an open position and a closed position. The spill valve solenoid 210 may actuate the spill valve member 208 between the open position and the closed position via the spill valve armature 212. In the open position, the spill valve member 208 may enable primary fuel within the pressurized fuel passage 246 to drain. In the closed position, the spill valve member 208 may prevent draining of the primary fuel, which permits pressurization of the primary fuel via movement of the plunger 202 within the chamber 204.

The control valve 214 may include the control valve member 216 that is movable between a non-injection position and an injection position. The control valve solenoid 218 may actuate the control valve member 216 between the non-injection position and the injection position via the control valve armature 220. In the non-injection position, the control valve member 216 may block a connection between the low-pressure fuel passage 244 and the control chamber 222. In the injection position, the control valve member 216 may connect the low-pressure fuel passage 244 and the control chamber 222. The control valve 214 may be configured to control the introduction of pilot fuel into the injection valve 226. In the injection position, the control valve member 216 may permit the control chamber 222 to provide pilot fuel to the injection valve 226.

The control valve 214 may include the control valve member 216 that is movable between a metering position and a non-metering position, which may correspond to the injection position and the non-injection position, respectively. The control valve solenoid 218 may actuate the control valve member 216 between the metering positon and the non-metering position via the control valve armature 220. The control valve 214 may be configured to perform fuel metering by supplying the pilot fuel into the nozzle 234 when the fuel injector 114 is not performing fuel injection. The control valve 214 may be actuated for a period of time prior to fuel injection to cause the pilot fuel to flow from the pilot fuel supply connection 242 to the low-pressure fuel passage 244. The control valve member 216 may permit the pilot fuel to pass the one-way valve 224 and enter into the injection valve fill passage 230, the radial fuel passage 248, the injection valve member 228, and the pilot fuel opening 240.

The control valve member 216 may be configured to over-travel. For instance, if the control valve member 216 is provided with a first signal having a first amplitude, then the control valve member 216 may be actuated by a first amount measured from a distal end of the control valve member 216 from a valve seat surface. Further, if the control valve member 216 is provided with a second signal having a second amplitude that is greater than the first amplitude, then the control valve member 216 may be actuated by a second amount that is greater than the first amount. The difference between the first amount and the second amount (e.g., an increased distance that valve member 216 moves away from the valve seat against a spring in the fuel injector 114) may constitute over-travel of the control valve member 216.

The injection valve 226 may include the injection valve member 228 that is movable between a non-injection position and an injection position. In the non-injection position, the injection valve member 228 may block the orifice 238 of the nozzle 234. In the injection position, the injection valve member 228 may un-block the orifice 238 to allow fuel injection of the primary fuel and/or the pilot fuel from the nozzle chamber 236.

The injection valve member 228 may have a needle-like shape that extends from a proximal end abutting the control chamber 222 to a distal end that blocks and unblocks the orifice 238. The injection valve member 228 may have a hollow interior that defines the injection valve passage 232. The injection valve passage 232 may be configured to guide pilot fuel to the distal end of the nozzle chamber 236 of the nozzle 234 and, if desired, store a quantity of the pilot fuel in the hollow interior. The hollow interior may extend from a central portion of the injection valve member 228 that abuts the injection valve fill passage 230 to the distal end of the injection valve member 228 within the nozzle chamber 236. The proximal portion of the injection valve passage 232 may include the radial fuel passage 248 in a central portion of the injection valve passage 232 that is in fluid communication with the injection valve fill passage 230. The injection valve passage 232 may include the pilot fuel opening at, or near, the distal end of the injection valve 226. The pilot fuel opening may open into the nozzle chamber 236 within the nozzle 234. The injection valve fill passage 230 may include the one-way valve 224 that allows flow of fuel from the control chamber 222 to the radial fuel passage 248, and prevents the fuel from returning to the control chamber 222 via the injection valve fill passage 230.

The fuel injector 114 may receive the primary fuel from the primary fuel reservoir 116. The fuel injector may 114 include a primary fuel path including the chamber 204, the pressurized fuel passage 246, the nozzle chamber 236, and the nozzle 234. The primary fuel path may also include the spill valve 206. The spill valve 206 may be configured to pressurize the primary fuel within the fuel injector 114, and drain the primary fuel from the fuel injector 114.

The fuel injector 114 may receive the pilot fuel from the pilot fuel reservoir 120. The fuel injector 114 may include a pilot fuel path. The pilot fuel path may include the pilot fuel supply connection 242, the low-pressure fuel passage 244, the injection valve fill passage 230, the control chamber 222, the injection valve passage 232 formed within a hollow interior of the injection valve 226 that includes the radial fuel passage 248, the pilot fuel opening 240, and the nozzle 234.

Figure 3:
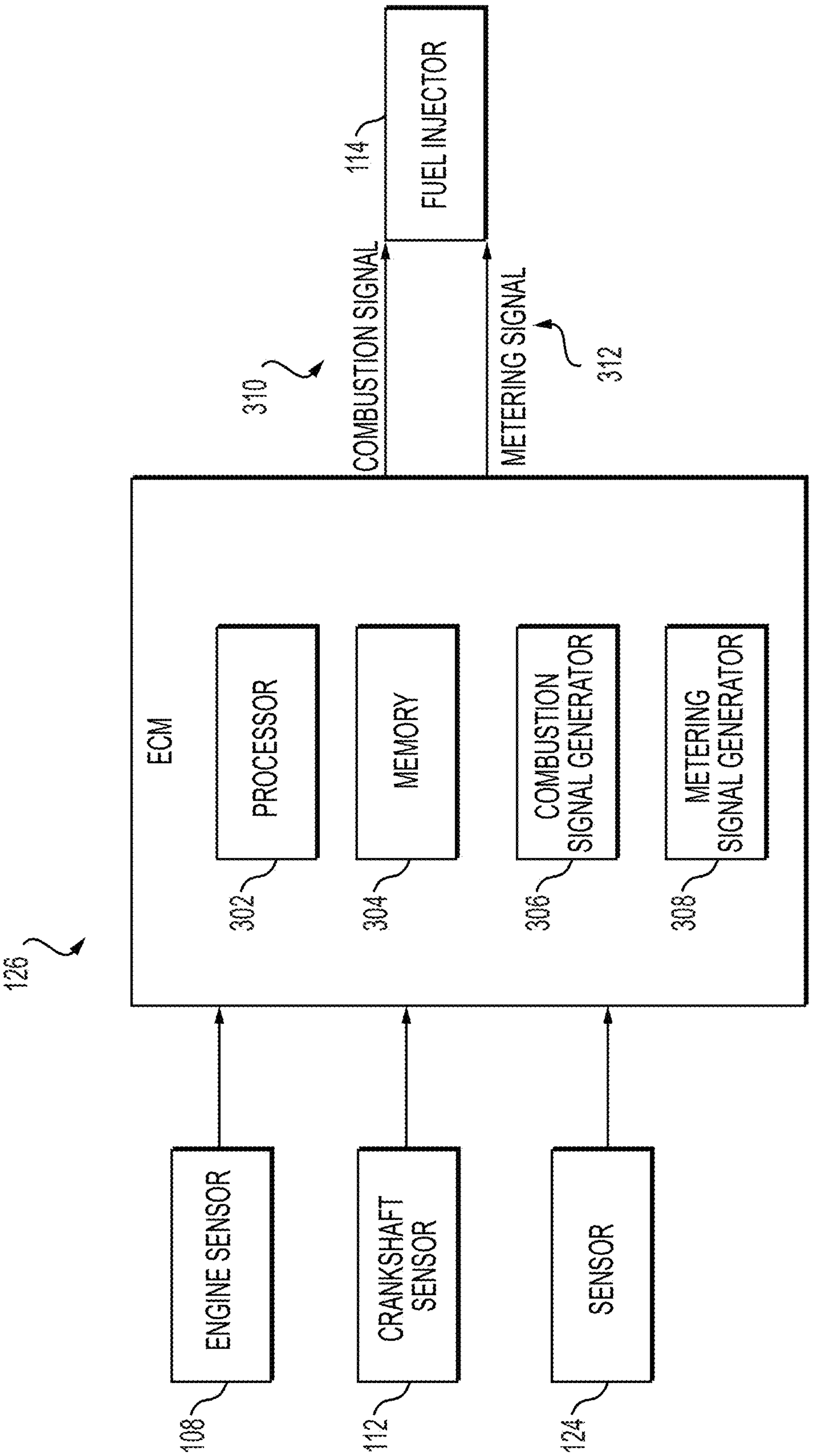
FIG. 3 is a diagram of an ECM.

FIG. 3 is a diagram of an example ECM 126. As shown in FIG. 3, the ECM 126 may include a processor 302, a memory 304, a combustion signal generator 306, and a metering signal generator 308.

The processor 302 may be a central processing unit (CPU), a graphics processing unit (GPU), an accelerated processing unit (APU), a microprocessor, a controller, a microcontroller, a digital signal processor (DSP), a field-programmable gate array (FPGA), an application-specific integrated circuit (ASIC), or the like. The processor 302 may be implemented in hardware, firmware, or a combination of hardware and software. The processor 302 may include one or more processors 302 configured to perform the operations described herein. For example, a single processor 302 may be configured to perform all of the operations described herein. Alternatively, multiple processors 302, collectively, may be configured to perform all of the operations described herein, and each of the multiple processors 302 may be configured to perform a subset of the operations described herein. For example, a first processor 302 may perform a first subset of the operations described herein, a second processor 302 may be configured to perform a second subset of the operations described herein, etc.

The memory 304 may be configured to store information and/or instructions for use by the processor 302. The memory 304 may be a non-transitory computer-readable medium. For example, the memory 304 may be a random access memory (RAM), a read only memory (ROM), a flash memory, a magnetic memory, an optical memory, or the like. The memory 304 may be configured to store instructions that, when executed by the processor 302, cause the processor 302 to perform the operations described herein. The memory 304 may include maps, look-up tables, functional relationships, or the like, that allow the processor 302 to set and monitor the fuel injection window, the reload windows, and/or the fuel metering window.

The combustion signal generator 306 may generate the combustion signal 310 which causes the control valve solenoid 218 to actuate the control valve member 216, via the control valve armature 220, to the injection position. The fuel injection may include the injection of primary fuel and/or pilot fuel by the fuel injector 114 into the cylinder 104. The combustion signal 310 may have a combustion waveform. For example, the combustion waveform may represent an amplitude of the combustion signal 310 versus time. The combustion waveform may have a combustion pull-in section, a combustion keep-in section, and/or a combustion hold-in section. The combustion pull-in section may have a current level that causes the control valve member 216 to start moving and reach the fully-actuated position. The combustion keep-in section may have a current level that is less than the combustion pull-in section and that prevents return of the control valve member 216. The combustion keep-in section may have a minimum or reduced current to minimize delay between when current drops to zero and when the control valve member 216 actually reaches the resting position. Although the combustion waveform is described herein as including particular sections and a particular number of sections, it should be understood that other embodiments may include combustion waveforms including any particular sections and any number of sections (e.g., a single section, two sections, three sections, four sections, etc.). In configurations with four sections, the sections may include a pull-in section, a keep-in section, a hold-in section, and a battery-power section. The battery-power section may have an amplitude that is similar to that of the hold-in section.

The metering signal generator 308 may generate the metering signal 312 which causes the control valve solenoid 218 to actuate the control valve member 216, via the control valve armature 220, to the metering position. The fuel metering may include the introduction of the pilot fuel from the low-pressure fuel passage 244 into the nozzle 234 via the injection valve fill passage 230 while the fuel injector 114 is not injecting fuel into the cylinder 104. The metering signal 312 may have a metering waveform. For example, the metering waveform may represent an amplitude of the metering signal versus time. The metering waveform may have a metering pull-in section, a metering keep-in section, and/or a metering hold-in section. The metering pull-in section may have a current level that causes the control valve member 216 to start moving and reach the fully-actuated position. The metering keep-in section may have a current level that is less than the metering pull-in section and that prevents return of the control valve member 216. The metering keep-in section may have a minimum or reduced current to minimize delay between when current drops to zero and when the control valve member 216 actually reaches the resting position. Although the metering waveform is described herein as including particular sections and a particular number of sections, it should be understood that other embodiments may include metering waveforms including any particular sections and any number of sections (e.g., a single section, two sections, three sections, four sections, etc.).

The ECM 126 may be configured to generate the combustion signal and/or the metering signal based on predetermined information. Additionally, or alternatively, the ECM 126 may be configured to generate the combustion signal and/or the metering signal based on engine sensor data received from the engine sensor 108, crankshaft sensor data received from the crankshaft sensor 112, and/or sensor data received from the sensor 124.

INDUSTRIAL APPLICABILITY

Figure 4:
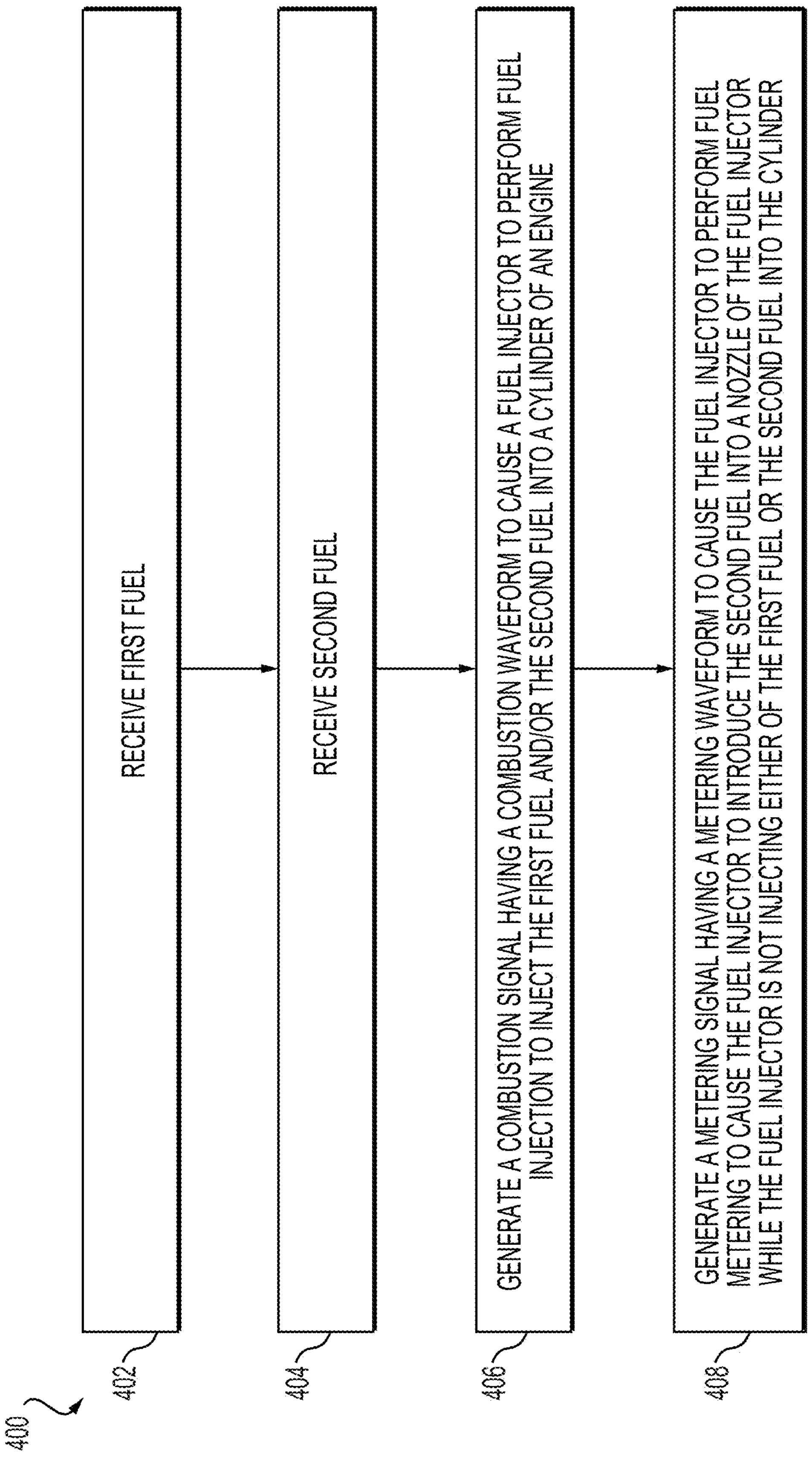
FIG. 4 is a flowchart of an example process for generating a combustion waveform and a metering waveform.

FIG. 4 is a flowchart of an example process 400 for generating a combustion signal having a combustion waveform and a metering signal having a metering waveform.

As shown in FIG. 4, the process 400 may include receiving first fuel (operation 402). For example, the multi-fuel injection system 100 may receive first fuel. The first fuel may be primary fuel. The primary fuel may be a fuel with a low cetane rating. For example, the cetane rating of the primary fuel may be less than a threshold (e.g., 20, 10, etc.). As a particular example, the primary fuel may be methanol.

As further shown in FIG. 4, the process 400 may include receiving second fuel (operation 404). For example, the multi-fuel injection system 100 may receive second fuel. The second fuel may be pilot fuel. The pilot fuel may be a fuel with a higher cetane rating than the primary fuel. For example, the cetane rating of the pilot fuel may be greater than a threshold (e.g., 20, 10, etc.). As a particular example, the pilot fuel may be diesel.

As further shown in FIG. 4, the process 400 may include generating a combustion signal having a combustion waveform to cause a fuel injector to perform fuel injection to inject the first fuel and/or the second fuel into a cylinder of the engine (operation 406). For example, the ECM 126 may generate a combustion signal 310 having a combustion waveform which causes the fuel injector 114 to perform fuel injection to inject the first fuel and/or the second fuel into the cylinder 104 of the engine 102 by the fuel injector 114. As a particular example, the ECM 126 may generate the combustion signal 310 which causes the control valve solenoid 218 to actuate the control valve member 216 to the injection position. The fuel injection may include the injection of the first fuel (e.g., primary fuel) and/or the second fuel (e.g., pilot fuel) by the fuel injector 114 into the cylinder 104.

The combustion signal 310 may have a combustion waveform. For example, the combustion waveform may represent an amplitude of the combustion signal 310 versus time. The combustion waveform may have a combustion pull-in section, a combustion hold-in section, and/or a combustion keep-in section.

Figure 5:
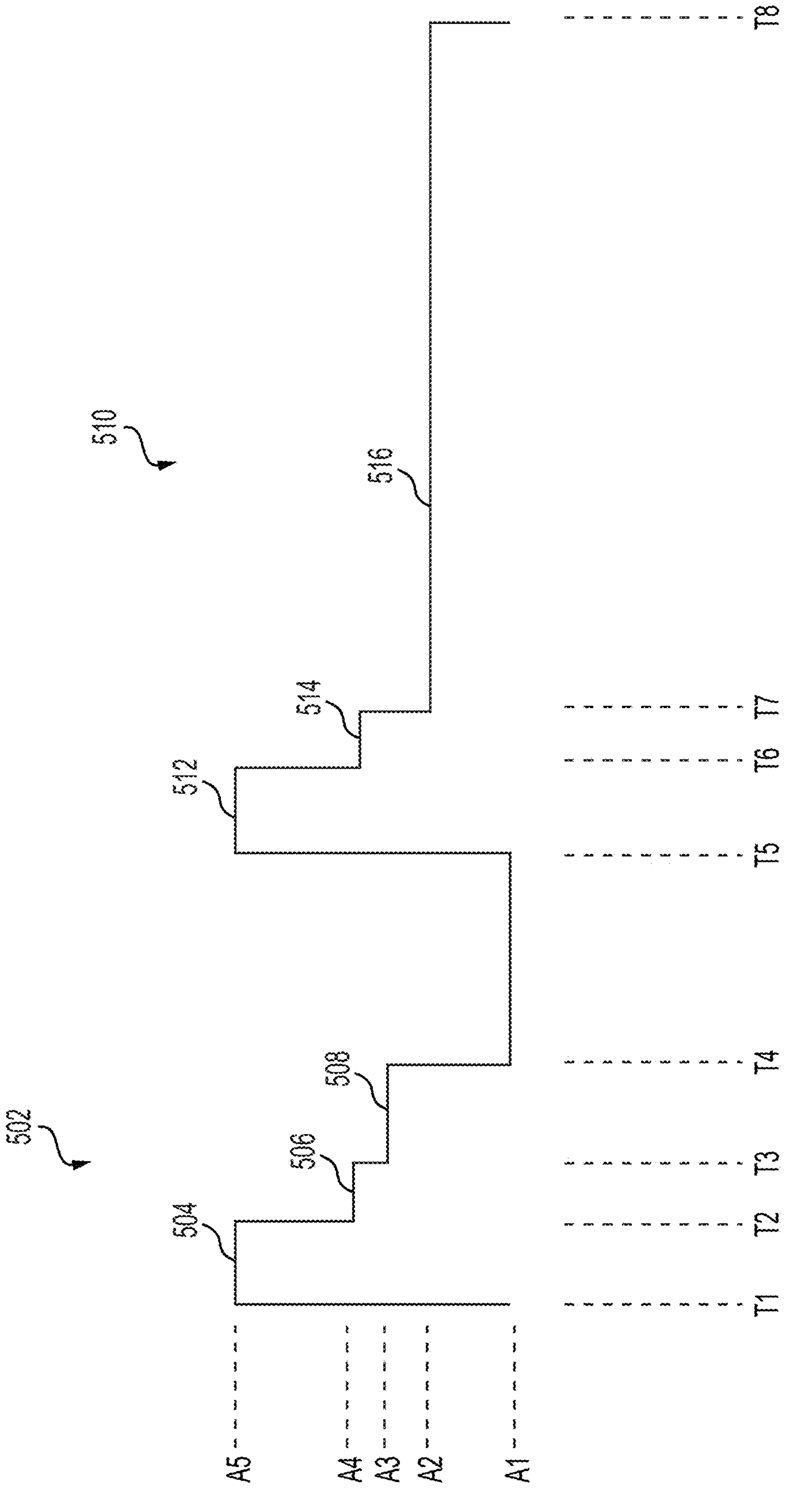
FIG. 5 is a diagram of an example combustion waveform and a metering waveform having a hold-in section with a reduced amplitude.

As an example, and as shown in FIG. 5, the ECM 126 may generate a combustion signal having a combustion waveform 502. The combustion waveform 502 may include a combustion pull-in section 504 that has a duration that extends from a time T1 to a time T2 and that includes an amplitude A5, a combustion keep-in section 506 that has a duration that extends from a time T2 to a time T3 and that includes an amplitude A4, and a combustion hold-in section 508 that has a duration that extends from a time T3 to a time T4 and that includes an amplitude A3. The illustrated amplitudes may represent the average current or target current for each section. The current (e.g., pull-in, keep-in, and/or hold-in sections) may be a chopped waveform in which the current regularly repeats between a maximum value and a minimum value that are slightly greater than and slightly less than the average value, respectively.

Figure 6:
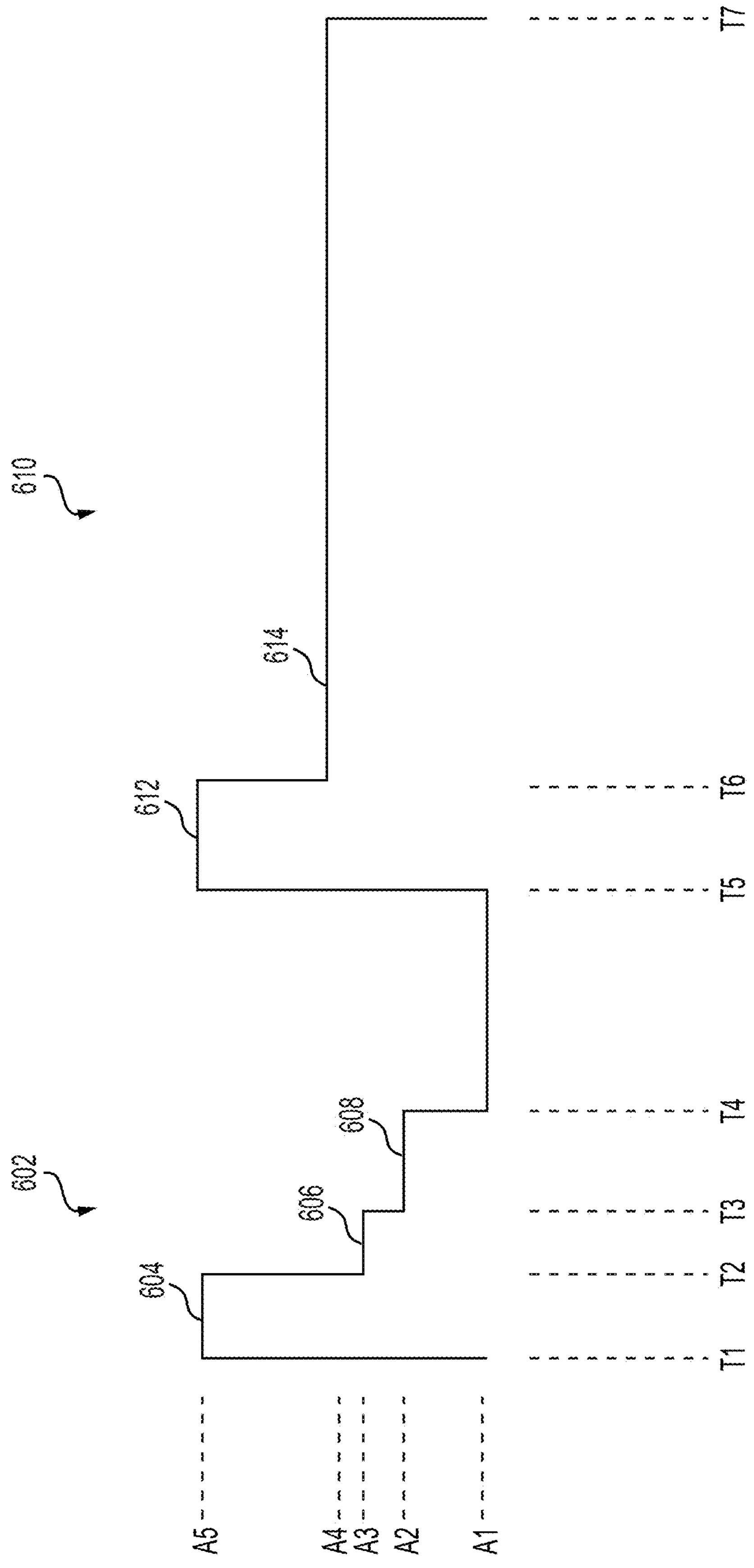
FIG. 6 is a diagram of an example combustion waveform and a metering waveform having a hold-in section with an increased amplitude.

As another example, and as shown in FIG. 6, the ECM 126 may generate a combustion signal having a combustion waveform 602. The combustion waveform 602 may include a combustion pull-in section 604 that has a duration that extends from a time T1 to a time T2 and that includes an amplitude A5, a combustion keep-in section 606 that has a duration that extends from a time T2 to a time T3 and that includes an amplitude A3, and a combustion hold-in section 608 that has a duration that extends from a time T3 to a time T4 and that includes an amplitude A2.

Figure 7:
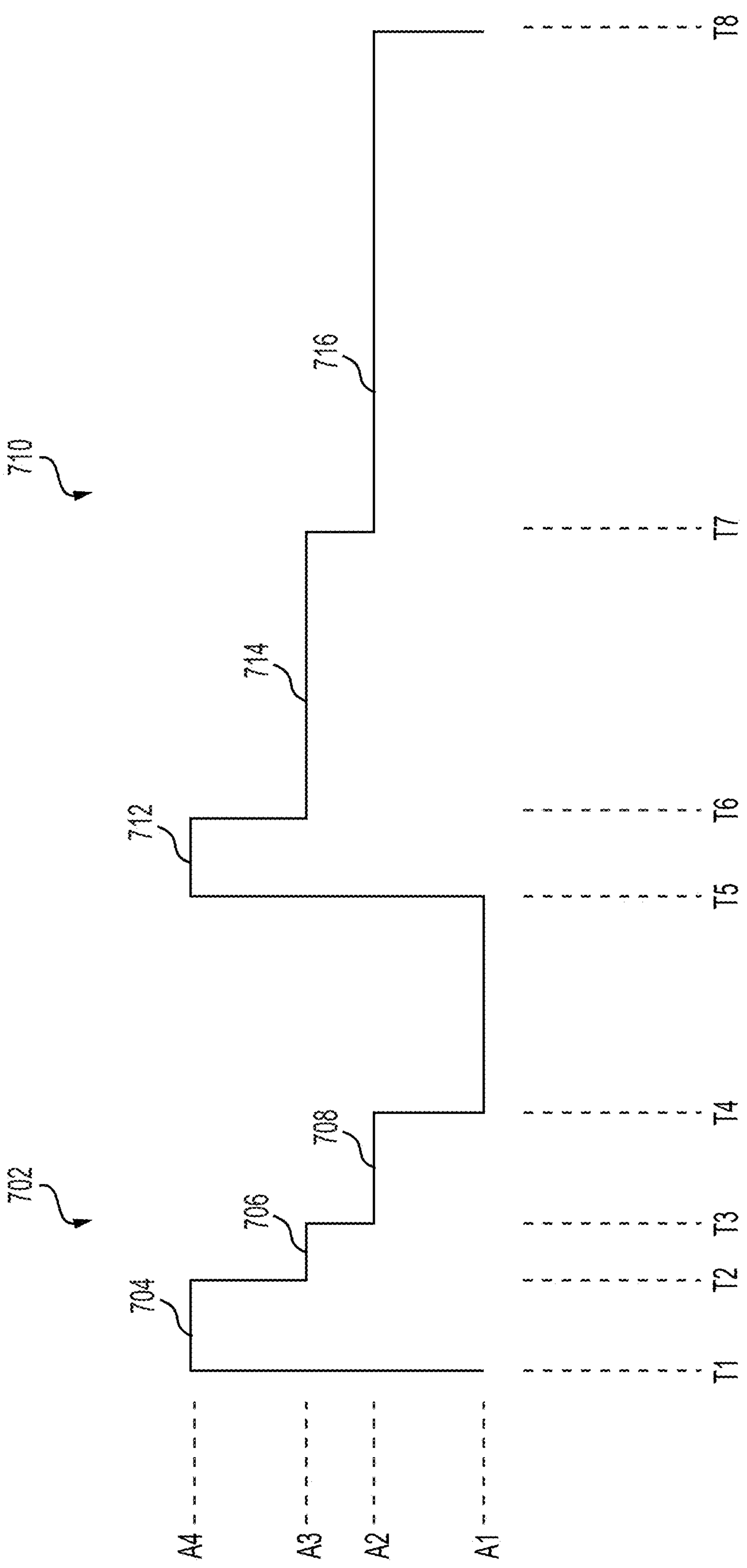
FIG. 7 is a diagram of an example combustion waveform and a metering waveform having a keep-in section with an increased duration.

As another example, and as shown in FIG. 7, the ECM 126 may generate a combustion signal having a combustion waveform 702. The combustion waveform 702 may include a combustion pull-in section 704 that has a duration that extends from a time T1 to a time T2 and that includes an amplitude A4, a combustion keep-in section 706 that has a duration that extends from a time T2 to a time T3 and that includes an amplitude A3, and a combustion hold-in section 708 that has a duration that extends from a time T3 to a time T4 and that includes an amplitude A2.

As further shown in FIG. 4, the process 400 may include generating a metering signal having a metering waveform to cause the fuel injector to perform fuel metering to introduce the second fuel into a nozzle of the fuel injector while the fuel injector is not injecting either of the first fuel or the second fuel into the cylinder of the engine (operation 408).

For example, the ECM 126 may generate a metering signal 312 having a metering waveform to cause the fuel injector 114 to perform fuel metering to introduce the second fuel into the nozzle 234 of the fuel injector 114 while the fuel injector 114 is not injecting either of the first fuel or the second fuel into the cylinder 104 of the engine 102. As a particular example, the ECM 126 may generate the metering signal to cause the control valve solenoid 218 to actuate the control valve member 216, via the control valve armature 220, to the metering position. The fuel metering may include the introduction of the pilot fuel from the low-pressure fuel passage 244 into the nozzle 234 via the injection valve fill passage 230 while the fuel injector 114 is not injecting either of the first fuel or the second fuel into the cylinder 104.

The metering signal 308 may have a metering waveform. For example, the metering waveform may represent an amplitude of the metering signal 312 versus time. The metering waveform may have a metering pull-in section, a metering keep-in section, and/or a metering hold-in section. The metering waveform may have one or more sections that have different durations and/or amplitudes as compared to corresponding one or more sections of the combustion waveform.

As shown in FIG. 5, the ECM 126 may generate a metering signal having a metering waveform 510. The metering waveform 510 may include a metering pull-in section 512 that has a duration that extends from a time T5 to a time T6 and that includes an amplitude A5, a metering keep-in section 514 that has a duration that extends from a time T6 to a time T7 and that includes an amplitude A4, and a metering hold-in section 516 that has a duration that extends from a time T7 to a time T8 and that includes an amplitude A2. As shown, the metering hold-in section 516 has a duration (T7-T8) that is greater than a duration (T3-T4) of the combustion hold-in section 508. Further, the metering hold-in section 516 has an amplitude (A2) that is less than an amplitude (A3) of the combustion hold-in section 508. The reduced amplitude A2 of the metering hold-in section 516 may facilitate sufficient flow of the pilot fuel to the nozzle 234 while preventing overheating of the control valve solenoid 218. In some aspects, metering hold-in section 516 may correspond to a period of time at which the pressure of the primary fuel within fuel injector 114 (e.g., in nozzle chamber 236 and/or in pressurized fuel passage 246) is relatively low.

As shown in FIG. 6, the ECM 126 may generate a metering signal having a metering waveform 610. The metering waveform 610 may include a metering pull-in section 612 that has a duration that extends from a time T5 to a time T6 and that includes an amplitude A5, and a metering hold-in section 614 that has a duration that extends from a time T6 to a time T7 and that includes an amplitude A4. As shown, the metering hold-in section 614 has a duration (T6-T8) that is greater than a duration (T3-T4) of the combustion hold-in section 608. Further, the metering hold-in section 614 has an amplitude (A4) that is greater than an amplitude (A2) of the combustion hold-in section 608. The increased amplitude A4 of the metering hold-in section 614 may cause over-travel of the control valve member 216 which may result in greater flow of the pilot fuel through the control valve 214 and which also may result in a reduced duration of the fuel metering as compared to situations in which over-travel is not caused.

As shown in FIG. 7, the ECM 126 may generate a metering signal having a metering waveform 710. The metering waveform 710 may include a metering pull-in section 712 that has a duration that extends from a time T5 to a time T6 and that includes an amplitude A5, a metering keep-in section 714 that has a duration that extends from a time T6 to a time T7 and that includes an amplitude A3, and a metering hold-in section 716 that has a duration that extends from a time T7 to a time T8 and that includes an amplitude A2. As shown, the metering keep-in section 714 has a duration (T6-T7) that is greater than a duration (T2-T3) of the combustion keep-in section 706. The longer keep-in section 714 may ensure the control valve 214 remains in the energized position while the control valve 214 may be perturbed by an external force, such as the fluid forces induced by the plunger 202 returning to an upward-most position.

The amplitudes A1, A2, A3, A4, and/or A5 in FIG. 5 may be the same as, or different than, the amplitudes A1, A2, A3, A4, and/or A5 in FIG. 6 and/or the amplitudes A1, A2, A3, and/or A4 in FIG. 7. Further, the times T1, T2, T3, T4, T5, T6, T7, and/or T8 in FIG. 5 may be the same as, or different than, the times T1, T2, T3, T4, T5, T6, and/or T7 in FIG. 6 and/or the times T1, T2, T3, T4, T5, T6, T7, and/or T8 in FIG. 7.

The ECM 126 may be configured to generate a metering waveform that has a metering pull-in section, a metering keep-in section, and/or a metering hold-in section based on preconfigured information, based on engine sensor data received from the engine sensor 108, based on crankshaft sensor data received from the crankshaft sensor 112, and/or based on sensor data received from the sensor 124. For example, the ECM 126 may select, or modify, the respective durations and/or amplitudes of the metering pull-in section, the metering keep-in section, and/or the metering hold-in section.

The disclosed aspects of the system and method for generating a combustion signal having a combustion waveform and a metering signal having a metering waveform may be used in conjunction with any appropriate machine, vehicle, or other device or system that includes an engine having a fuel injector that is configured to perform fuel injection and fuel metering. In particular the system and method may be used in any heavy equipment, marine power system, oil and gas system, industrial power system, or the like, in which an ECM may generate a metering signal having a metering waveform that is asymmetrical to a combustion waveform of a combustion signal. The disclosed aspects may provide faster metering, reduced solenoid temps, ability to adapt metering for particular conditions, or the like.

It will be apparent to those skilled in the art that various modifications and variations can be made to the disclosed system and method without departing from the scope of the disclosure. Other embodiments of the system will be apparent to those skilled in the art from consideration of the specification and practice of the system and method disclosed herein. It is intended that the specification and examples be considered as exemplary only, with a true scope of the disclosure being indicated by the following claims and their equivalents.

What is claimed is:

1. A method comprising:

receiving, by a multi-fuel injection system, a first fuel;

receiving, by the multi-fuel injection system, a second fuel;

generating, by the multi-fuel injection system, a combustion signal to cause a fuel injector to perform fuel injection to inject at least one of the first fuel or the second fuel into a cylinder of an engine; and generating, by the multi-fuel injection system, a metering signal to cause the fuel injector to perform fuel metering to introduce the second fuel into a nozzle of the fuel injector while the fuel injector is not injecting either of the first fuel or the second fuel into the cylinder of the engine, wherein the combustion signal includes a combustion waveform including at least one of a combustion keep-in section or a combustion hold-in section, wherein the metering signal includes a metering waveform including at least one of a metering keep-in section or a metering hold-in section, and wherein a duration of the metering keep-in section is different than a duration of the combustion keep-in section or an amplitude of the metering hold-in section is different than an amplitude of the combustion hold-in section.

2. The method of claim 1, wherein the combustion signal includes the combustion hold-in section, the metering signal includes the metering hold-in section, and the duration of the metering hold-in section is greater than the duration of the combustion hold-in section.

3. The method of claim 1, wherein the combustion signal includes the combustion hold-in section, the metering signal includes the metering hold-in section, and the amplitude of the metering hold-in section is less than the amplitude of the combustion hold-in section.

4. The method of claim 1, wherein the combustion signal includes the combustion hold-in section, the metering signal includes the metering hold-in section, and the amplitude of the metering hold-in section is greater than the amplitude of the combustion hold-in section.

5. The method of claim 1, wherein the combustion signal includes the combustion keep-in section, the metering signal includes the metering keep-in section, and the duration of the metering keep-in section is greater than the duration of the combustion keep-in section.

6. The method of claim 1, wherein the first fuel is a primary fuel, and the second fuel is a pilot fuel.

7. The method of claim 1, wherein the first fuel has a lower cetane rating than the second fuel.

8. An electronic control module (ECM) comprising:

a memory configured to store instructions; and one or more processors configured to execute the instructions to:

generate a combustion signal to cause a fuel injector to perform fuel injection to inject at least one of a first fuel or a second fuel into a cylinder of an engine; and generate a metering signal to cause the fuel injector to perform fuel metering to introduce the second fuel into a nozzle of the fuel injector while the fuel injector is not injecting either of the first fuel or the second fuel into the cylinder of the engine, wherein the combustion signal includes a combustion waveform including at least one of a combustion keep-in section or a combustion hold-in section, wherein the metering signal includes a metering waveform including at least one of a metering keep-in section or a metering hold-in section, and wherein a duration of the metering keep-in section is different than a duration of the combustion keep-in section or an amplitude of the metering hold-in section is different than an amplitude of the combustion hold-in section.

9. The ECM of claim 8, wherein the combustion signal includes the combustion hold-in section, the metering signal includes the metering hold-in section, and the duration of the metering hold-in section is greater than the duration of the combustion hold-in section.

10. The ECM of claim 8, wherein the combustion signal includes the combustion hold-in section, the metering signal includes the metering hold-in section, and the amplitude of the metering hold-in section is less than the amplitude of the combustion hold-in section.

11. The ECM of claim 8, wherein the combustion signal includes the combustion hold-in section, the metering signal includes the metering hold-in section, and the amplitude of the metering hold-in section is greater than the amplitude of the combustion hold-in section.

12. The ECM of claim 8, wherein the combustion signal includes the combustion keep-in section, the metering signal includes the metering keep-in section, and the duration of the metering keep-in section is greater than the duration of the combustion keep-in section.

13. The ECM of claim 8, wherein the metering signal causes over-travel of the fuel injector.

14. The ECM of claim 8, wherein the ECM is configured to generate the metering signal based on engine sensor data received from an engine sensor, crankshaft sensor data received from a crankshaft sensor, or sensor data received from a sensor.

15. A system comprising:

a fuel injector configured to perform fuel injection and fuel metering; and an electronic control module (ECM) configured to:

generate a combustion signal to cause the fuel injector to perform the fuel injection to inject at least one of a first fuel or a second fuel into a cylinder of an engine; and generate a metering signal to cause the fuel injector to perform the fuel metering to introduce the second fuel into a nozzle of the fuel injector while the fuel injector is not injecting either of the first fuel or the second fuel into the cylinder of the engine, wherein the combustion signal includes a combustion waveform including at least one of a combustion keep-in section or a combustion hold-in section, wherein the metering signal includes a metering waveform including at least one of a metering keep-in section or a metering hold-in section, and wherein a duration of the metering keep-in section is different than a duration of the combustion keep-in section or an amplitude of the metering hold-in section is different than an amplitude of the combustion hold-in section.

16. The system of claim 15, wherein the combustion signal includes the combustion hold-in section, the metering signal includes the metering hold-in section, and the duration of the metering hold-in section is greater than the duration of the combustion hold-in section.

17. The system of claim 15, wherein the combustion signal includes the combustion hold-in section, the metering signal includes the metering hold-in section, and the amplitude of the metering hold-in section is less than the amplitude of the combustion hold-in section.

18. The system of claim 15, wherein the combustion signal includes the combustion hold-in section, the metering signal includes the metering hold-in section, and the amplitude of the metering hold-in section is greater than the amplitude of the combustion hold-in section.

19. The system of claim 15, wherein the combustion signal includes the combustion keep-in section, the metering signal includes the metering keep-in section, and the duration of the metering keep-in section is greater than the duration of the combustion keep-in section.

20. The system of claim 15, wherein the first fuel is a primary fuel, and the second fuel is a pilot fuel.

* * * * *